March 21, 1967     F. F. OFFNER     3,310,667
RECORDER MULTIPLIER

Filed June 25, 1963     3 Sheets-Sheet 1

INVENTOR.
FRANKLIN F. OFFNER
BY
*Paul R. Harder*
ATTORNEY

INVENTOR.
FRANKLIN F. OFFNER

United States Patent Office 3,310,667
Patented Mar. 21, 1967

3,310,667
RECORDER MULTIPLIER
Franklin F. Offner, Deerfield, Ill., assignor to Beckman Instruments, Inc., a corporation of California
Filed June 25, 1963, Ser. No. 290,365
15 Claims. (Cl. 235—194)

This invention relates to a circuit for multiplying two or more electrical signals and more particularly to a multiplication circuit for use with a recorder having a movable element which moves as a function of the electrical signal to be recorded.

It is at present a common practice to utilize a moving element to record electrical signals by one of several means. The present invention provides, by utilization of the moving element of the recorder, a convenient apparatus for multiplying the function being recorded by one or more other functions. By utilizing recorders having several channels allowing simultaneous recordation of several different inputs each of the functions and their products may be individually and simultaneously recorded if such is desired.

It is, therefore, the principal object of this invention to provide an apparatus for use with a recorder employing a movable element moving as a function of an electrical input signal for multiplying the electrical input signal by one or more other electrical signals and providing the products thereof without substantial interference with recording of the input signal.

A further object is the provision of an apparatus which may be utilized to readily convert a recorder having an element movable as a function of a first input into a multiplier wherein the output is the product of the first input signal to the recorder and one or more electrical signals.

To accomplish these objects one embodiment of the present invention contemplates the use of a recorder wherein a feedback voltage which is a function of the stylus position is provided in the servo control loop of the stylus. By superimposing on this feedback voltage a carrier signal whose amplitude is modulated as a function of a second input signal a composite signal is provided which has a first component representing the position of the stylus and which may be utilized in the stylus control loop and a second component which is a function of the product of the two signals. By separating these components the product of the two signals is provided without substantial interference with the recordation of one or both of the individual signals.

Other objects and many of the attendant advantages of this invention will become more readily understood by those skilled in the art by reference to the following description when considered in connection with the accompanying drawings and wherein.

Figure 1:
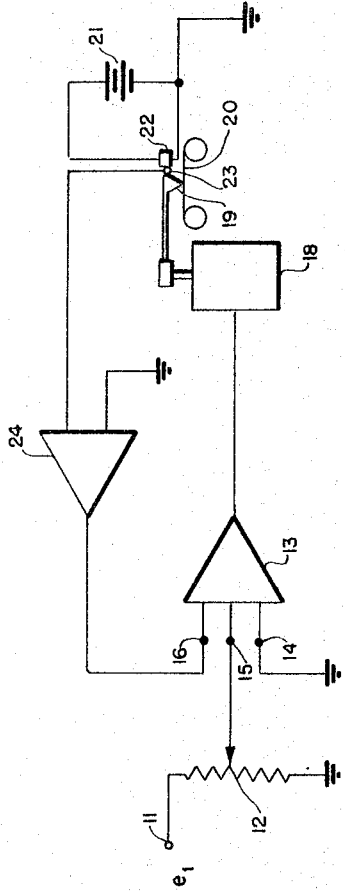
FIG. 1 is a schematic diagram of a prior art servo recording system.

Referring now to FIG. 1 there is illustrated an exemplary embodiment of a typical prior art recorder utilizing a movable element which moves as a function of the electrical signal recorded and which may conveniently be modified after the teachings of this invention to perform multiplication of the recorded signal with one or more other signals. The signal $e_1$ to be recorded is introduced at the recorder input terminal 11 and, if desired, is attenuated by attenuator 12. Amplifier 13 has three input terminals 14, 15 and 16 of which terminal 14 is a common or ground terminal. The input signal is applied at terminal 15 and the output of the amplifier is proportional to the difference between the signals appearing at terminals 15 and 16 or, alternatively, to the sum of these signals. The output of the amplifier drives a galvanometer 18 which is coupled to the recording stylus 19 by any suitable means. The stylus moves over a moving chart 20 driven by any suitable means not shown. A source 21 has its output terminals connected across a resistor in the form of a slidewire 22 positioned adjacent the stylus 19. Stylus 19 additionallly carries a contact 23 which moves along slidewire 22 as stylus 19 is moved by galvanometer 18 in response to the output of amplifier 13. The signal picked up from resistor 22 by contact 23 may, if desired, be amplified by amplifier 24 and applied to the input terminal 16 of amplifier 13. Assuming that the gain of amplifier 15 is high, and is dependent on the difference between the signals applied to terminals 15 and 16, the stylus 19 will be driven to a point where the feedback signal picked up by contact 23 and applied at the input terminal 16 is substantially equal to the input signal $e_1$ applied at input terminal 15. Thus, as is well known in the art, the movement of contact 23 along slidewire 22 is proportional to the amplitude of the input signal $e_1$. Amplifiers 13 and 24 may either or both include various derivative circuits for stabilizing the servo loop but these circuits have not been illustrated here for the sake of simplicity.

The above disclosed recorder system may be modified in accordance with the teachings of this invention so as to operate simultaneously as a multiplier. One method of modification is to employ with the stylus two or more contact elements moving over a like number of slidewires. One of the slidewires provides the position feedback signal just as in the case of slidewire 22 of FIG. 1. Across the other slidewire an input signal is applied which is to be multiplied with the input signal to the recorder. As the recording stylus moves in response to the recorder input signal the contact element on the second slidewire is positioned along the second slidewire and receives therefrom a voltage proportional to the voltage applied across the slidewire and also proportional to the position of the contact along the slidewire.

This type of multiplying system suffers from several disadvantages. The system first requires the additional complexity of one or more auxiliary slidewires and additional spring-loaded contacts each insulated one from the other. These additional contacts add mass and friction to the stylus arm thereby retarding its response speed and accuracy. Further, if there is any relative motion between the contacts the motion of the multiplying contact is not exactly consistent with the motion of the signal feedback contact resulting in errors in the system.

Figure 2:
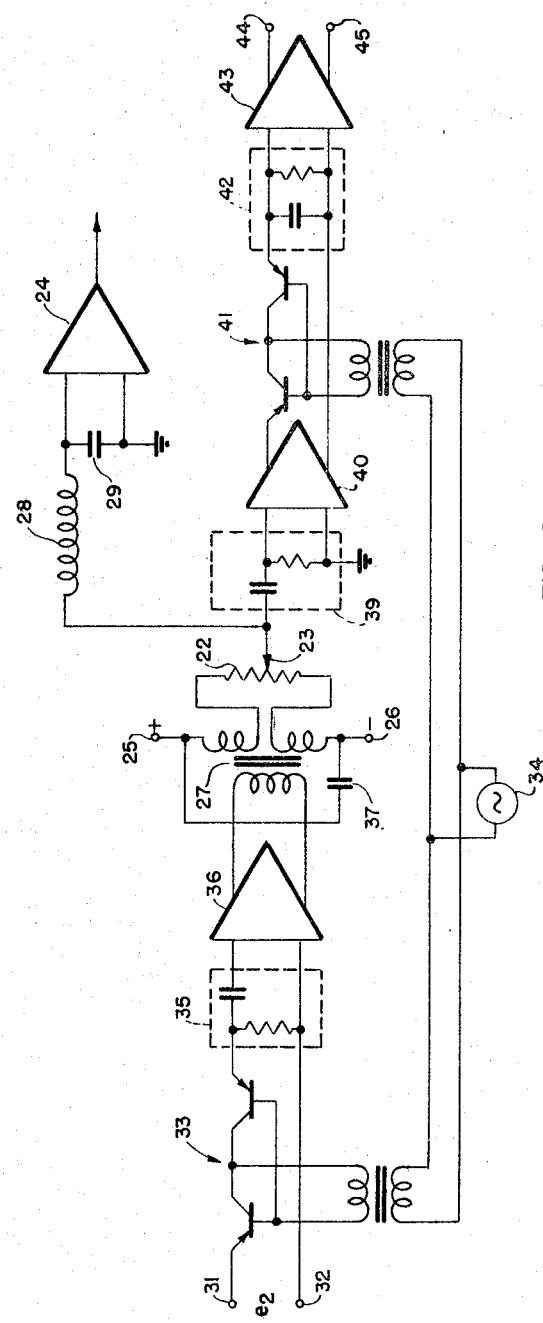
FIG. 2 is a partial schematic circuit diagram of one exemplary embodiment of this invention wherein the product of two electrical signals is provided.

To overcome these disadvantages the present invention utilizes the same slidewire and contact as is utilized in the feedback loop of the servo system to perform the desired multiplication. FIG. 2 illustrates an exemplary preferred embodiment of a circuit constructed in accordance with the teachings of this invention. All of the details of FIG. 1 have not been illustrated in FIG. 2 and those components common to each are designated with common numerals. In FIG. 2 slidewire 22, contact 23 and amplifier 24 represent the common components between FIGS. 1 and 2, it being understood that contact 23 is carried by stylus 19 which is driven by the galvanometer. The output of amplifier 24 is connected to an input terminal of the amplifier 13 to complete the servo loop. The biasing voltage necessary to provide the servo feedback signal is applied between terminals 25 and 26 but now passes through the secondaries of transformer 27. A low pass filter utilizing inductor 28 and capacitor 29 is connected between contact 23 and the input of the feedback amplifier 24.

An electrical signal $e_2$, to be multiplied with the signal $e_1$ being applied to the recorder input, is applied across a pair of input terminals 31 and 32. The signal applied at the input terminals 31 and 32 is modulated or chopped by a transistor chopper driven at the frequency of oscillator 34.

The output of chopper 33 is applied through RC network 35 to the input of amplifier 36 having its output connected across the primary winding of transformer 27. The RC network 35 blocks any D.C. components from being applied at the input of amplifier 36. The transformer 27 has a pair of secondaries which are preferably symmetrical and wound in such a manner that a voltage of one phase will be developed across one secondary and the opposite phase developed across the other. One end of each of the secondaries is connected to opposite ends of the slidewire 22 and the other ends are respectively connected to terminals 25 and 26. A capacitor 37 is connected between terminals 25 and 26 and provides a closed circuit path for alternating current to prevent the alternating current from flowing through the D.C. source. If terminal 25 is connected to a D.C. source that is positive with respect to ground and terminal 26 is connected to a source that is negative with respect to ground and, provided the secondaries of transformer 27 are symmetrical, then a neutral point at the center of slidewire 22 will be provided without the need of grounding. Since the chopped or high frequency signal is applied in opposite phases across the slidewire 22 with respect to the center, four quarter multiplication may be achieved as will be more fully set forth as the description proceeds.

Contact 23 is connected to the input of amplifier 24 as has been hereinbefore described and is further connected through RC network 39, proportioned to block effectively signal components of $e_1$, to one input terminal of amplifier 40. The other input terminal is connected to circuit ground. The output of amplifier 40 is demodulated by chopper 41 driven in synchronism with chopper 33 by oscillator 34. The output of chopper 41 passes through RC network 42, is amplified by amplifier 43 and applied across the output terminals 44 and 45.

In operation, contact 23 is positioned along slidewire 22 in response to the input signal $e_1$ applied at the input terminal 11 by the action of the servo system of FIG. 1 as previously described. The signal applied through terminals 31 and 32 is chopped periodically at the frequency of the oscillator 34 which may typically be of a frequency of several thousand cycles per second. The output of the chopper is a chopped wave having a frequency of the oscillator 34, and the amplitude thereof is determined by the amplitude of the input signal $e_2$. The relative phase of these chopped waves is determined by the polarity of the input signal $e_2$.

As contact 23 moves along slidewire 22 in response to the action of the servo system the signal developed at contact 23 has a D.C. or low frequency component representative of the position of the contact along slidewire 22 and a high frequency component proportional to the amplitude of the input signal $e_2$ and to the position of the contact along the slidewire. The D.C. or low frequency signal appearing at contact 23 will pass inductance 28 relatively unimpeded and will likewise only be slightly affected by capacitor 29. The high frequency component will be impeded by inductor 28 and by proper arrangement of the value of capacitor 29 any portion thereof passing the inductor may be shorted to ground. Thus, only the D.C. and low frequency component appearing at contact 29 is applied at the input of amplifier 24 connected in the feedback loop of the servo system and the servo system of the recorder continues to operate in the same manner as described in connection with FIG. 1.

The D.C. and any low frequency component of the signal appearing at contact 23 is blocked by network 39; however, the component chopped at the frequency of oscillator 34 is passed thereby and applied to the input of the amplifier 40. The output of amplifier 40 is demodulated by transistor demodulator 41, filtered by network 42, again amplified and applied to the output terminals 44 and 45. As has been hereinbefore pointed out, the D.C. bias and the chopped signal applied across slidewire 22 are arranged such that a neutral point appears at the center of the slidewire. Since the amplitude across one-half of the slidewire is proportional to the amplitude of the input signal $e_2$ and since contact 23 is moved along the slidewire by amount proportional to the amplitude of the input signal $e_1$, the output at terminals 44 and 45 is proportional to the product of signals $e_1$ and $e_2$. Further, since the D.C. bias applied across slidewire 22 has a neutral point at the center thereof and since the signal appearing across one-half of the slidewire due to the chopped signal $e_2$ is of one phase while the signal across the other half is of opposite phase, there is also a neutral point at the center of slidewire 22 for the chopped signal. Thus, four quadrant multiplication may be achieved without the necessity of grounding the center of the slidewire and the polarity of the output signal at terminals 44 and 45 is determined by the sign of the input signals $e_1$ and $e_2$.

It is apparent to those skilled in the art that a negative voltage need not be applied to one side and a positive voltage applied to the other side of slidewire 22. In place of providing a zero potential with respect to ground at the center point of the slidewire the same effect may be accomplished by properly biasing the input of amplifier 13. This may be accomplished by returning input terminal 14 to a variable D.C. potential rather than to ground as illustrated. In this manner the output of amplifier 24 may be made zero for any desired D.C. voltage picked off of slidewire 22 by contact 23. This alternative arrangement has the advantage that the same slidewire may be used for a number of recording channels, different portions of the slidewire being used for the various channels and the amplifier 13 being individually adjusted to operate around the desired zero point.

Figure 3:
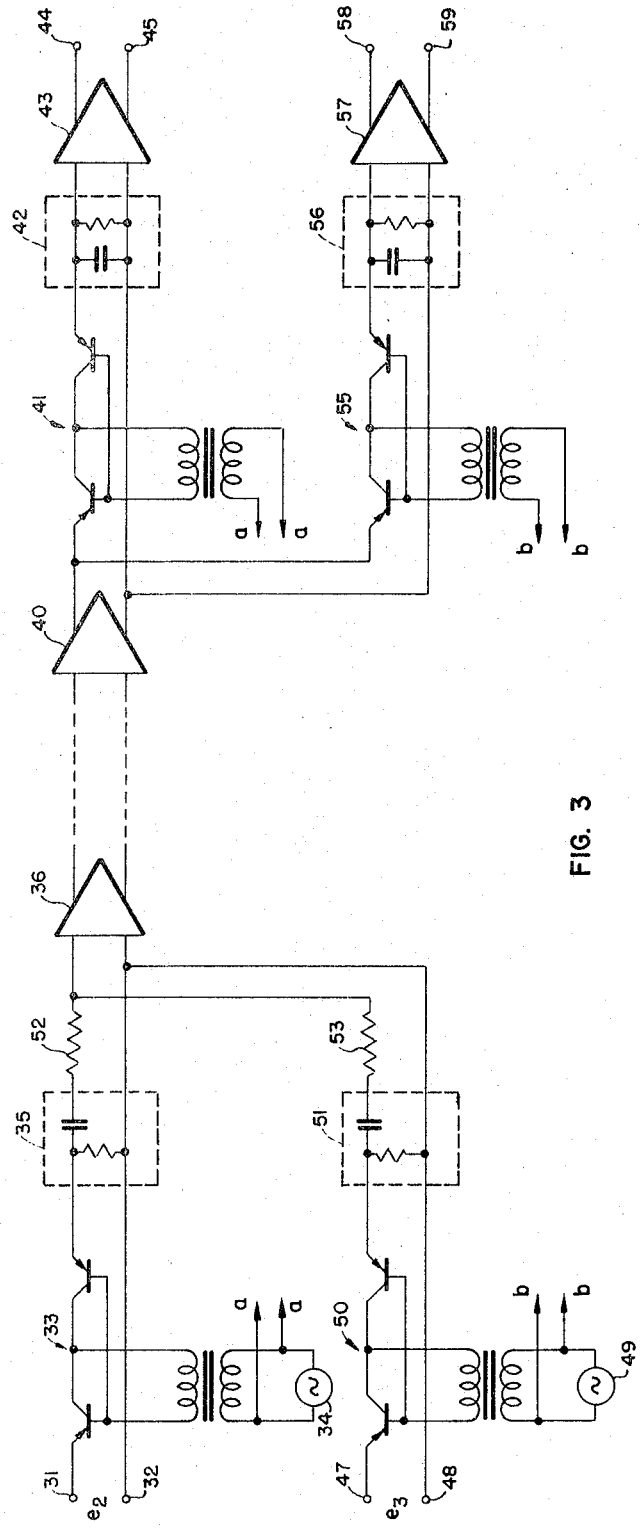
FIG. 3 is a second exemplary embodiment wherein one signal may be multiplied by two or more other signals and the separate products provided.

FIG. 3 illustrates a modification of the embodiment of FIG. 2 which enables several multiplication operations to be performed simultaneously. In such a system one of the terms to be multiplied is always the recorder input signal $e_1$ applied at terminal 11 but this signal may be simultaneously multiplied by several other quantities to obtain the various products simultaneously. In the embodiment of FIG. 3 the components corresponding to those components of FIG. 2 are indicated by the same reference numerals and that portion of FIG. 2 that is identical to that illustrated in FIG. 2 has been omitted from FIG. 3.

In the embodiment of FIG. 3 a second signal $e_3$ to be multiplied with signal $e_1$ is applied at input terminals 47 and 48. The input signal $e_3$ is chopped periodically at the frequency of oscillator 49 by chopper 50, the output of which is passed through network 51. Oscillators 34 and 49 are operated at different frequencies that are preferably not in harmonic relation; for example, oscillator 34 may operate at 5,000 c.p.s. and oscillator 49 at 6,000 c.p.s.

The outputs of modulators 33 and 50 are summed through resistors 52 and 53 and applied to the input of amplifier 36. The remainder of the circuit functions as described in connection with FIG. 2 through the output of amplifier 40. Here the output signal of amplifier 40 is demodulated by two separate demodulators 41 and 55. Demodulator 41 is driven by oscillator 34 and demodulator 55 is driven by oscillator 49. Thus, demodulator 55 is operated at the frequency of modulator 50 and demodulator 41 is operated at the frequency of modulator 33. The output of demodulator 55 is passed through RC network 56 and amplified by amplifier 57 applied to the output terminals 58 and 59. It is then apparent that the output at terminals 44 and 45 is proportional to the product of $e_1$ and $e_2$ and that the output at terminals 58 and 59 is proportional to the product of $e_1$ and $e_3$. It is also apparent that the circuit may be utilized to perform any number of multiplications simultaneously by the addition of successive modulators and demodulators each operating at a different frequency.

Figure 4:
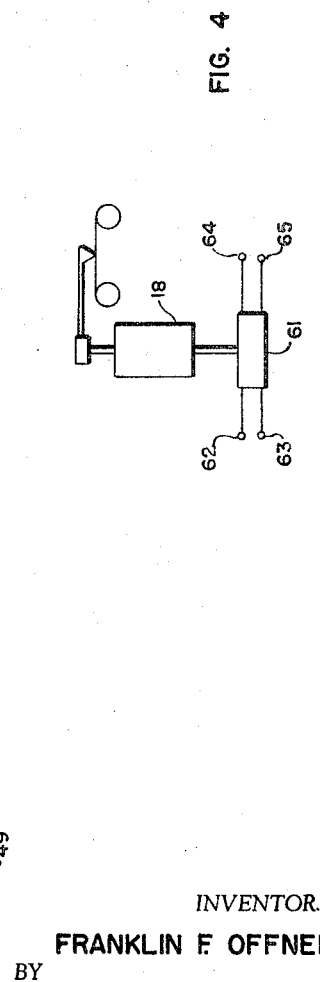
FIG. 4 illustrates an alternative arrangement of the stylus servo system of the recorder.

There is illustrated in FIG. 4 an alternative embodiment of the invention wherein the slidewire of the servo feedback loop is not utilized. In this embodiment the galvanometer 18, in addition to driving the stylus, also drives the armature of a rotary differential transformer 61 having a pair of input leads 62 and 63 and a pair of output leads 64 and 65. To utilize such a transducer the circuit of FIG. 2 is modified as illustrated in FIG. 5.

In this embodiment the output of a signal generator 67 is applied directly to the input of amplifier 36 through an input resistance 68. The input signal $e_2$, the signal which is to be multiplied by the recorded signal $e_1$, is applied across input terminals 31 and 32 and is chopped at the frequency of oscillator 34 by chopper 33. The modulated signal is applied through R.C. network 35 and input resistor 52 to the input of amplifier 36 in the same manner as has been illustrated and described in connection with FIG. 3. The output of amplifier 36, instead of being applied across the slidewire illustrated in FIG. 2, is utilized to excite the differential transformer 61 through input leads 62 and 63.

Figure 5:
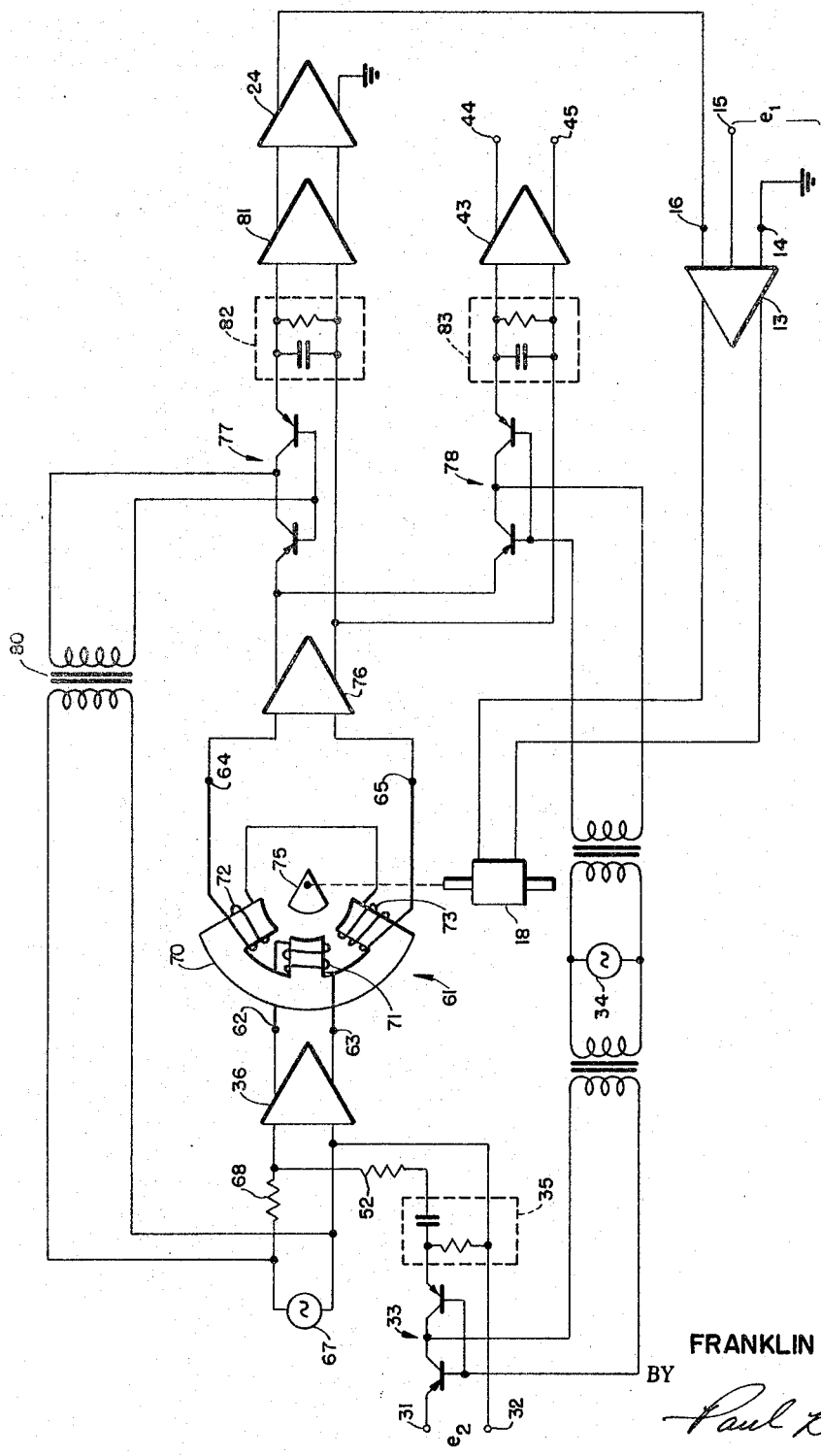
FIG. 5 illustrates a schematic circuit diagram of the invention for use with the recorder of FIG. 4.

Although the rotary differential transformer 61 may take various forms, the one illustrated in FIG. 5 has a three legged iron core 70 which is excited by the exciting winding 71 wound on the central leg. The output of the transformer developed at output terminals 64 and 65 is taken from differentially wound secondary windings 72 and 73. Differential windings 72 and 73 are wound such that if equal flux passes through the corresponding legs no output voltage is produced at terminals 64 and 65. However, if movable armature 75 is displaced from its central position by galvanometer 18 a differential voltage is induced, its amplitude being proportional to the amount of displacement of the armature 75 from its central position and its phase depending upon the sense or direction of the displacement.

The output of the differential transformer 61 is applied across the input of an amplifier 76. The output of amplifier 76 is demodulated by two separate demodulators 77 and 78. Demodulator 77 is driven by oscillator 67 through transformer 80, the output of the demodulator being applied to the input of amplifier 81 through RC network 82. The output of amplifier 81 is connected to the servo feedback amplifier 24 corresponding to the servo feedback amplifier of FIGS. 1 and 2. As in FIG. 2 the output of amplifier 24 is applied to input terminal 16 of amplifier 13.

The output of amplifier 76 is also applied to the input of demodulator 78 driven in synchronism with modulator 33 by oscillator 34. The output of demodulator 78 is passed through RC network 83 and amplified by amplifier 43 corresponding to amplifier 43 of FIG. 2.

If the output of oscillator 67 is constant the input signal to amplifier 24 is a signal having an amplitude proportional to the displacement of armature 75 from its null position and a phase related to the sense or direction of the displacement. The output of amplifier 24 may again be applied as the feedback signal at input terminal 16 of amplifier 13. Since the demodulator 78 is driven in synchronism with modulator 33 the output thereof and at output terminals 44 and 45 of amplifier 43 is a signal proportional to the product of input signal $e_1$ applied at input terminal 15 of amplifier 13 and input signal $e_2$.

As an alternative feature of the embodiment of FIG. 5 it is apparent that if the output of oscillator 67 is varied in accordance with any desired function then the recorder will record the product of this function and $e_1$. For example, if the amplitude of oscillator 67 is modulated in accordance with an input signal $e_3$ then the recorder will record the product of $e_1$ and $e_3$ and the output at terminals 44 and 45 will be the product of $e_1$, $e_2$ and $e_3$. It is further obvious that the embodiment of FIG. 2 may operate in a similar manner if a variable function is applied across the slidewire.

It should be understood that the specification herein describes only typical embodiments of the invention and that wide latitude is possible in many of the details. For example, the motion sensing mechanism has been illustrated in only two versions, that of a slidewire and a rotary differential transformer. It is to be understood that other types of sensors capable of transmitting high frequencies for carrier purposes may be employed such, for example, as capacitive pick-ups, photoelectric or photoconductive devices, and strain gauges. It is further apparent that the amplifier 24 in the feedback loop of the servo system of FIG. 1 is not required if the output signal from the feedback pick-up is sufficiently large, or if amplifier 13 has sufficient gain. In some cases it is preferable to incorporate all of the phase lead in amplifier 13 and have either direct coupling from the position sensing element to amplifier 13 or to have amplifier 24 provide only direct amplification without any phase correction. Alternatively, amplifier 24 may be utilized to provide a phase correction which may be a phase lag in order to have the position of the voltage pick-off element, that is, the contact 23 of FIG. 1 or the armature 75 of FIG. 3, in close phase relationship with the input signal over the desired computing frequency range.

While elements 33, 42, 50 and 55 have been illustrated as transistorized half-wave modulators and demodulators it is apparent that other various types of half-wave modulators and demodulator circuits may be utilized, or where a wider frequency response is desirable, full-wave modulator and demodulator circuits may be incorporated.

While the drive mechanism of the stylus has been illustrated generally as a galvanometer coil 18 it is apparent that any suitable drive mechanism may be employed such, for example, as a servo motor, with suitable amplifier modifications as is well known in the art. Further, while the drive has been shown as of the rotary type it is apparent that a linear drive may also be readily employed. In such a case, rather than a rotary differential transformer 61 as illustrated in FIGS. 4 and 5 a linear version may be conveniently employed.

While the instant invention has been described in particularity in connection with a recorder it is to be understood that recording of the signal $e_1$ is not essential if only the multiplication feature is desired. It is apparent that the instant invention may be utilized to conveniently convert existing recorder equipment into multiplication equipment without affecting the operation of the recording equipment and without extensive changes. It is further apparent that the invenion is applicable to other types of recording apparatus other than the stylus type as illustrated.

What is claimed is:
1. In combination:
a servo recorder having a linear transducer and a recording element movable as a linear function of a first input signal;
sensing means comprising said linear transducer connected to said movable element for sensing the position of said element;
means for modulating a high frequency signal as a function of a second input signal;
means for applying said modulated high frequency signal to said transducer; and
means connected to said transducer for transmitting said high frequency signal in direct linear proportion to the position of said movable element.

2. In combination:
a servo recorder having a linear transducer and a recording element movable as a linear function of the amplitude and polarity of a first input signal;
sensing means comprising said linear transducer having an input and an output for sensing the position of said movable element;
means connected to the input of said transducer for applying a high frequency signal having an amplitude proportional to the amplitude of a second input signal and a phase proportional to the polarity of said second input signal;
means connected to the output of said transducer for transmitting said high frequency signal in direct linear proportion to the position of said movable element; and
means connected to the output of said transducer for providing a D.C. signal whose amplitude and polarity is proportional to the algebraic product of said first and second input signal.

3. In combination:
a recorder having a recording element movable as a function of a first input signal;
a pair of input terminals adapted to receive a second input signal;
a source of high frequency signal;
modulating means connected to said pair of input terminals and said high frequency signal source for modulating said high frequency signal as a function of said second input signal;
sensing means comprising a linear transducer connected to said modulating means and said movable element for transmitting a portion of said modulated signal as a function of the position of said movable element; and
means connected to said last named means for demodulating said transmitted signal to provide a D.C. signal proportional to the product of said first and second input signals.

4. In combination:
a recorder having a voltage-balancing servo loop and an element movable as a linear function of a first input signal;
means adapted to receive a high frequency signal modulated in accordance with a second input signal;
a linear transducer coupled to said element and to said last named means for producing a feedback signal for said recorder servo loop and for transmitting a portion of said modulated signal, both as a linear function of said first input signal, so as to produce an output that is a function of the product of said first and second signal.

5. In combination:
a recorder having a stylus movable as a function of a first input signal;
a slidewire;
a source of direct current connected across said slidewire;
a contact carried by said stylus and engaging said slidewire for providing a direct current feedback signal for said recorder;
a source of high frequency signal;
modulating means connected to the output of said source of high frequency signal for modulating said source as a function of a second input signal;
means connecting the output of said modulating means across said slidewire;
first filter means connected to said contact and to the feedback loop of said recorder for blocking the output of said modulating means while passing a direct current signal from said contact to said feedback loop;
a direct current blocking means connected to said contact, said direct current blocking means passing the modulated signal unimpeded; and
means connected to said blocking means for demodulating said signal for providing an output that is a function of the product of said first and second input signals.

6. In combination:
a recorder having an element movable as a function of a first input signal and including a feedback loop;
sensing means connected to said feedback loop for sensing the position of said element and providing a feedback signal proportional to the position thereof;
terminal means for receiving a second input signal;
chopping means connected to said terminal means and said sensing means for chopping said second input signal and applying said chopped signal to said sensing means; said sensing means transmitting said chopped signal in proportion to the position of said movable element;
said feedback loop including means for blocking said chopped signal;
means connected to said sensing means for passing said chopped signal; and
means connected to said last named means for demodulating said chopped signal to provide an output proportional to the product of said first and second input signals.

7. In combination:
a recorder having a stylus movable as a function of a first input signal;
a slidewire;
a source of direct current connected across said slidewire so as to provide a neutral point intermediate the ends thereof;
a contact carried by said stylus and engaging said slidewire for providing a direct current feedback signal for said recorder;
a source of high frequency signal;
modulating means connected to the output of said source of high frequency signal for modulating said source as a function of a second input signal;
means connecting the output of said modulating means across said slidewire so as to provide an A.C. neutral point coincident with the D.C. neutral point of said source of direct current;
means connected to said contact for blocking the output of said modulating means and for passing a direct current signal from said contact to the feedback loop of said recorder;
means connected to said contact for blocking direct current and passing the modulated signal unimpeded; and
means connected to said last named means for demodulating said modulated signal to provide a D.C. output that is a function of the product of said first and second input signals.

8. In combination:
a voltage-balancing servo recorder having an element movable as a linear function of a first input signal and including a feedback loop;

sensing means comprising a linear transducer connected to said feedback loop for sensing the position of said element and providing a feedback signal as a linear function of the position thereof;

means connected to said linear transducer for receiving a high frequency signal modulated as a function of a second input signal;

said sensing means transmitting a portion of said high frequency signal as a linear function of the position of said movable element; and means connected to said transducer for providing an output proportional to the product of said first and second input signals.

9. A recorder multiplier for multiplying first and second signals comprising:

a recording stylus;

means connected to said stylus and moving said stylus as a function of the amplitude and polarity of a first input signal;

sensing means connected to said stylus for sensing the position of said stylus;

modulating means for modulating a high frequency signal in accordance with the amplitude and polarity of a second input signal;

means connecting the output of said modulating means to said sensing means, said sensing means transmitting said modulated signal as a function of said first input signal to provide an output signal whose amplitude and polarity is a function of the product of said first and second input signal.

10. A recorder multiplier for multiplying first and second signals comprising:

a recording stylus;

drive means connected to and moving said stylus as a linear function of the amplitude and polarity of a first input signal;

position sensing means comprising a linear transducer connected to said drive means for sensing the position of said stylus, said linear transducer means having input and output terminals;

means for modulating an A.C. signal as a function of said second input signal and for applying the modulated A.C. signal to said input terminals, said linear transducer producing an A.C. signal at its output having an amplitude and phase proportional to the product of said first and second input signals, and a D.C. signal at its output having an amplitude proportional to said first input terminal.

11. The recorder multiplier of claim 10 wherein said linear transducer comprises a differential transformer.

12. A recorder multiplier for multiplying a plurality of input signals comprising:

a recorder having an element movable as a function of a first input signal;

means coupled to said movable element for sensing the position thereof, said means producing an output signal having an amplitude proportional to the amplitude of movement of said movable element and a polarity indicative of the direction of said movement from a null position;

a source of high frequency signal;

modulating means connected to said source of high frequency signal for modulating said signal as a function of a second input signal, said modulating means having an output whose amplitude is a function of said second input signal and a polarity indicative of the polarity of said second input signal;

means connecting the output of said modulating means to said sensing means;

said sensing means transmitting said modulating signal in such amplitude and polarity so as to produce an output that is a function of the product of the amplitude and polarity of said first and second signals.

13. A recorder multiplier for multiplying a plurality of input signals comprising:

a recorder having a movable element moving as a linear function of the amplitude and polarity of a first input signal;

sensing means comprising a linear transducer coupled to said movable element for sensing the position of said element and transmitting a signal the amplitude and polarity of which is a linear function of position of said movable element;

a source of high frequency signal;

modulating means connected to the output of said source of high frequency signal for modulating said source as a function of a second input signal;

means connecting the output of said modulating means to said linear transducer so as to provide a neutral point coincident with the null position of said movable element;

said linear transducer transmitting said modulated signal in such amplitude and phase as to produce an output that is a function of the product of the amplitude and phase of said first and second input signals.

14. A recorder multiplier for multiplying a plurality of input signals comprising:

a recorder having a stylus movable as a function of a first input signal;

a slidewire;

a source of direct current connected across said slidewire so as to provide a neutral point intermediate the end thereof;

a contact carried by said stylus and engaging said slidewire for providing a direct current feedback signal for said recorder;

a source of high frequency signal;

modulating means connected to the output of said source of high frequency signal for modulating said signal as a function of the amplitude and phase of a second input signal;

a transformer having a primary winding and a pair of secondary windings;

means connecting the output of said modulating means across said primary winding;

means interconnecting one end of each of said pair of secondary windings;

means connecting the other end of each of said pair of secondary windings to opposite ends of said slidewire, said secondary windings being wound in such a manner so as to provide similar signals of opposite phase about said neutral point;

means connected to the output of said sensing means for blocking the output of said modulating means and passing a direct current signal from said sensing means to the feedback loop of said recorder;

means connected to the output of said sensing means for blocking direct current and passing said modulated signal unimpeded; and means connected to said last named means for demodulating said modulated signal to provide an output having an amplitude and polarity that is a function of the product of the amplitude and polarity of said first and second input signals.

15. A recorder multiplier for multiplying first and second input signals comprising:

a recorder having an element movable from a null position as a function of the amplitude and polarity of said first input signal;

a differential transformer having a movable element connected to said movable element of said recorder;

excitation means connected to said differential transformer for exciting said transformer with a high frequency signal.

modulating means adapted to receive a high frequency signal for modulating said high frequency signal in proportion to the amplitude and polarity of the second input signal; said output of said modulating means being connected to said differential transformer;

means connected to said excitation means and to the output of said differential transformer for producing a signal having an amplitude and polarity proportional to the amount and direction of displacement of said movable element of said recorder from said null position;

demodulating means adapted to be driven in synchronism with said modulating means;

means connecting the input of said demodulating means to the output of said differential transformer; said demodulating means producing at its output a signal having an amplitude and polarity that is proportional to the algebraic product of said first and second input signals.

References Cited by the Examiner

UNITED STATES PATENTS 2,725,192  11/1955  Kolderup _____ 235—194
3,015,767  1/1962  Taylor _____ 235—196

OTHER REFERENCES

Karplus and Soroka, Analog Methods, McGraw-Hill, 1959 (QA, 76.4, S6, 1959), pages 20–21 and 50–51.

MALCOLM A. MORRISON, *Primary Examiner.*

K. W. DOBYNS, A. J. SARLI, *Assistant Examiners.*